2/14/84 XR 4,431,695

United States Patent [19]

Flatscher

[11] 4,431,695

[45] Feb. 14, 1984

[54] HIGH RESOLUTION RECORDING MEDIUM

[75] Inventor: Georg Flatscher, Schneizlreuth, Fed. Rep. of Germany

[73] Assignee: Dr. Johannes Heidenhain GmbH, Traunreut, Fed. Rep. of Germany

[21] Appl. No.: 230,280

[22] Filed: Jan. 30, 1981

[30] Foreign Application Priority Data

Oct. 28, 1980 [DE] Fed. Rep. of Germany ....... 3040489

[51] Int. Cl.³ ...................... G01D 15/34; G02B 5/28; B32B 3/10

[52] U.S. Cl. .................................... 428/209; 350/166; 428/210; 428/432; 428/433; 428/457; 428/469; 428/471; 428/472; 428/699; 428/701; 428/913; 346/135.1; 430/5; 430/320; 430/321; 430/363

[58] Field of Search .................... 350/166; 430/5, 945, 430/320, 321, 363; 428/432, 433, 457, 469, 209, 210, 913, 471, 472, 699, 701; 346/135.1; 369/284, 286, 288

[56] References Cited

U.S. PATENT DOCUMENTS

| | | | |
|---|---|---|---|
| 2,721,808 | 10/1955 | Roberts et al. | 428/209 |
| 4,029,394 | 6/1977 | Araki | 350/166 |
| 4,151,321 | 4/1979 | Heisinger | 430/5 |
| 4,219,826 | 8/1980 | Bloom et al. | 430/945 |
| 4,262,302 | 1/1981 | Benton et al. | 428/913 |
| 4,270,132 | 5/1981 | Bell | 346/135.1 |

*Primary Examiner*—Ellis P. Robinson

*Attorney, Agent, or Firm*—Willian, Brinks, Olds, Hofer, Gilson & Lione Ltd.

[57] ABSTRACT

A multi-color, high density recording medium including a substrate having at least two patterned interference filters formed thereon is described. Each of the filters transmits a different wavelength range of visible light and each of the filters comprises an unpatterned interference layer of an inorganic material which is substantially absorption-free in the visible wavelength range of the spectrum. At least one of the interference filters formed on the substrate comprises a first, unpatterned reflecting layer positioned on one side of the respective interference layer, and a second, patterned reflecting layer positioned on the other side of the respective interference layer, such that the pattern of only the first reflecting layer forms the pattern of the at least one interference filter.

19 Claims, 2 Drawing Figures

FIG. 1
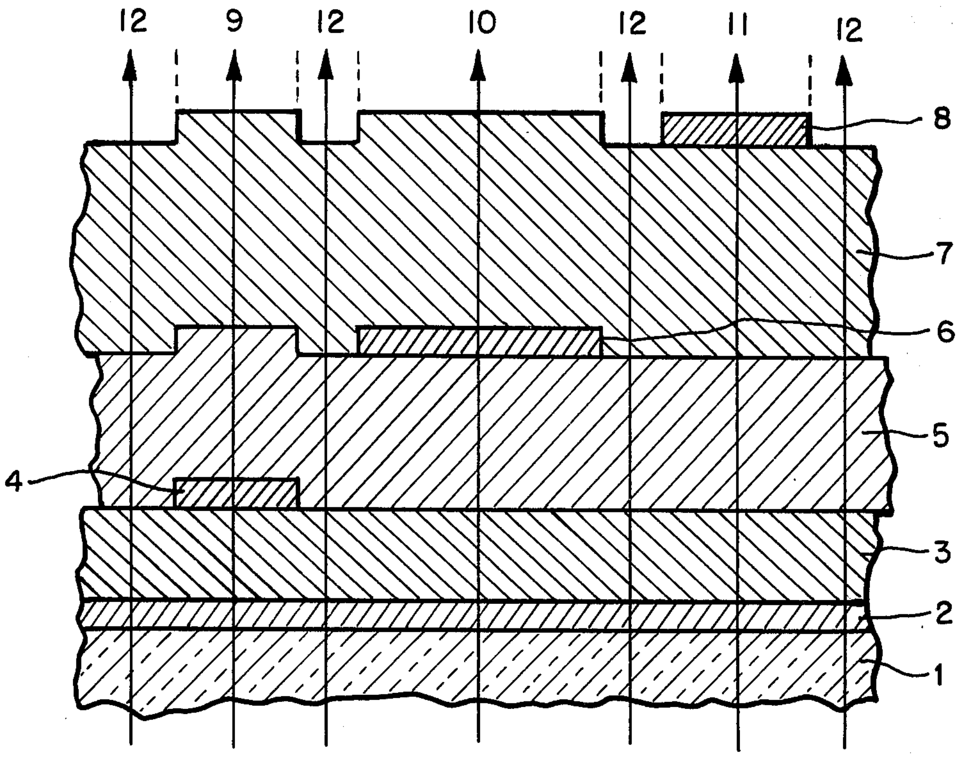
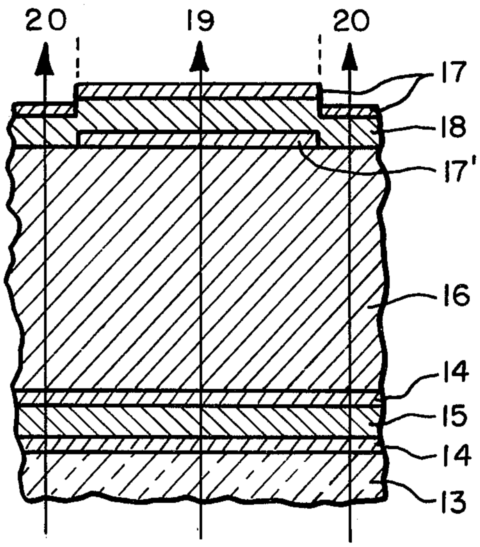
FIG. 2

HIGH RESOLUTION RECORDING MEDIUM

This invention relates to improvements in multi-color, high density recording media of the type which include a substrate having at least two patterned interference filters formed thereon, wherein each of the filters transmits a different wavelength range of visible light.

Such recording media are used, for example, for the storage of documents and drawings in a very small space. Such media are particularly useful for the storage of multi-color maps.

U.S. Pat. No. 4,151,321 describes a high resolution recording medium of the type described above, in which the recording is formed in several colors by means of at least two patterned interference filters for two different wavelength ranges of visible light. As described in that patent, each interference filter comprises an unstructured interference layer of an inorganic material which is free of absorption in the visible wavelength range of the spectrum. Each interference layer is bounded on each side by a reflecting layer of an inorganic material, and it is the pattern of these reflecting layers which determines the pattern of the recording.

As explained in detail in the above-referenced patent, two patterned reflecting layers are used in each patterned interference filter, one on each side of the respective interference layer, and it is the thickness and the reflectivity of these two patterned reflecting layers which determine the saturation of the color of the respective interference filter. It has been found, however, that in the production of such high resolution recording media, and especially in the production of extremely high resolution recording media, difficulties can arise in the accurate alignment of the positions of the exposure masks used to pattern the two reflecting layers on both sides of the interference layer. If the two patterned reflecting layers are not accurately superimposed, information can be falsified or even lost.

SUMMARY OF THE INVENTION

The present invention is directed to an improved high resolution recording medium of the type described above which substantially avoids the problem of precise alignment of multiple patterned layers included in a patterned interference filter.

According to this invention, at least one of the interference filters formed on the substrate comprises a first, unpatterned reflecting layer positioned on one side of the respective interference layer, and a second, patterned reflecting layer positioned on the other side of the respective interference layer, such that the pattern of only the first reflecting layer forms the pattern of the at least one interference filter. In alternate embodiments of this invention the patterned and the unpatterned reflecting layers can comprise either a metallic film, or a high refraction reflecting layer formed of an inorganic material which is substantially absorption-free in the visible wavelength range of the spectrum.

An important advantage of the present invention is that only one patterned layer is needed to form a patterned interference filter of the type described above. Because only one reflecting layer (whether formed of a reflective material or a high refraction absorption-free material) on only one side of the respective interference layer is needed. In this way, precise alignment between multiple patterned layers of a single interference filter is not required. This advantage of the present invention makes possible a considerable saving in time, and in addition makes possible a high precision, high resolution recording medium which can be manufactured with reduced falsification or loss of information.

The present invention, together with further objects and attendant advantages, will best be understood by reference to the following detailed description taken in connection with the accompanying drawings.

BRIEF DESCRIPTION OF THE DRAWINGS

FIG. 1 shows a sectional view of a first preferred embodiment of the recording medium of this invention, showing patterned interference filters for three separate colors.

FIG. 2 shows a partial sectional view of a second preferred embodiment of this invention which includes a single patterned interference filter.

DETAILED DESCRIPTION OF THE PREFERRED EMBODIMENTS

Turning now to the drawings, FIG. 1 shows a transparent substrate 1, which can be formed, for example, of glass or quartz glass. An unpatterned reflective layer 2 is applied over the entire surface of the substrate 1. This reflecting layer 2 is preferably formed of an inorganic material, such as silver, for example. Over the unpatterned reflecting layer 2 is formed a first unpatterned interference layer 3, which is preferably formed of an inorganic material such as $MgF_2$, $SiO_2$, ThF, SiO, or $Ta_2O_5$, for example. Preferably, the interference layer 3 is formed of a material which is substantially absorption-free in the visible wavelength range of the spectrum. A first patterned reflecting layer 4 is deposited over selected portions of the first interference layer 3. This first reflecting layer 4 is formed into the desired pattern by means of the well known micro-photo-lithographic process with the aid of an exposure mask.

The unpatterned reflecting layer 2, the unpatterned first interference layer 3, and the patterned reflecting layer 4 cooperate to form a first patterned interference filter in the region of the arrow 9. In this exemplary embodiment, the color hue of this first interference filter, which is determined by the thickness of the unpatterned interference layer 3, is blue. The pattern of this blue interference filter is determined solely by the pattern of the reflecting layer 4. The thickness and therefore the reflectivity of the patterned reflecting layer 4 and of the oppositely situated unpatterned reflecting layer 2 in the region of the arrow 9 cooperate to determine the saturation of the color transmitted by the first interference filter.

In order to generate a second color hue (for example, the color green) in the zone of the arrow 10, a second unpatterned interference layer 5 is formed over the interference layer 3 and the reflecting layer 4. In addition, a second patterned reflecting layer 6 is formed over selected portions of the second interference layer 5. The second patterned reflecting layer 6 cooperates with the unpatterned reflecting layer 2 and the interference layers 3 and 5 to produce a second patterned interference filter, in this example for the color green. The color hue which is transmitted by the second interference filter in the region of the arrow 10 is determined by the combined thicknesses of the two interference layers 3 and 5. As before, it is only the pattern of the upper patterned reflecting layer 6 which determines the pattern of this second interference filter. The thicknesses and therefore the reflectivity of the patterned reflecting layer 6 and of the oppositely situated unpatterned reflecting layer 2 in the region of the arrow 10 determine the saturation of the color transmitted by the second interference filter.

A third unpatterned interference layer 7 is deposited over the reflecting layer 6 and the interference layer 5, and a third patterned reflecting layer 8 is formed over selected portions of this third interference layer 7. The unpatterned reflecting layer 2 cooperates with the combined thickness of the interference layers 3, 5, 7, and the patterned reflecting layer 8 to form a third interference filter in the region of the arrow 11. This third patterned interference filter transmits a third color hue, which in this exemplary embodiment is the color red. As before, the color transmitted by the third interference filter in the region of the arrow 11 is determined by the combined thicknesses of the unpatterned interference layers 3, 5 and 7. This third interference filter is patterned by the patterned reflecting layer 8 in the region of the arrow 11. The thickness and therefore the reflectivity of the patterned reflecting layer 8 and of the oppositely situated unpatterned reflecting layer 2 in the region of the arrow 11 determine the saturation of the color transmitted by the third interference filter.

Of course, it should be understood that the unpatterned reflecting layer can be placed at any desired position in the construction of the interference filter, and there is no requirement that the unpatterned reflecting layer be deposited directly on the substrate 1.

Turing now to FIG. 2, a second preferred embodiment of the recording medium of this invention utilizes a different type of reflecting layer than the embodiment of FIG. 1. This second preferred embodiment includes a transparent substrate 13 on which are arranged, one over another, an unpatterned high refraction reflecting layer 14, an unpatterned low refraction reflecting layer 15, another unpatterned high refraction reflecting layer 14, an unpatterned interference layer 16, a patterned high refraction reflecting layer 17', an unpatterned low refraction reflecting layer 18, and an unpatterned high refraction reflecting layer 17. These seven layers are superimposed over one another in the configuration shown in FIG. 2 to produce a seven layer interference filter.

The interference filter of FIG. 2 transmits a second color hue, for example the color green, in the region of the arrow 19. This color hue is determined by the thickness of the unpatterned interference layer 16. The pattern of the interference filter of FIG. 2 is determined solely by the pattern of the high refraction reflecting layer 17'. The thicknesses and therefore the reflectivity of the patterned, high refraction reflecting layer 17' and of the unpatterned high refraction reflecting layers 14,17, as well as of the unpatterned low refraction reflecting layers 15,18 in the zone of the arrow 19, determine the saturation of the color transmitted by the interference filter of FIG. 2.

In embodiments of the type shown in FIG. 2 there is in each case provided on each side of the interference layer at least one high refraction reflecting layer of an inorganic material which is substantially absorption-free in the visible wavelength range. In the case of more than one high refraction reflecting layer on each side of the interference layer, there is provided an unpatterned low refraction reflecting layer of an inorganic material which is substantially absorption-free in the visible wavelength range between every pair of high refraction reflecting layers. Preferably, of all the reflecting layers on both sides of the interference filter, only one high refraction reflecting layer on only one side of the interference layer is patterned. Thus, only the pattern of a single high refraction reflecting layer determines the pattern of the interference filter, while the other high refraction reflecting layers remain unpatterned so that precise alignment of multiple patterned reflecting layers is avoided.

In consequence of the transmission characteristics of the unpatterned reflecting layer 2 in FIG. 1 and of the unpatterned high refraction reflecting layers 14,17 and of the unpatterned low refraction reflecting layers 15,18 in FIG. 2, a certain reduction in the transmission of unfiltered light in the zones of the arrows 12,20 occurs. However, this transmission has proved to be an advantage in that the contrast of the individual color tones is thereby increased.

Of course, it should be understood that various changes and modification to the preferred embodiments described above can be made without departing from the spirit and scope of the present invention. For example, an opaque substrate having a reflective surface can be substituted for the transparent substrates 1,15 of the above-described embodiments. It is therefore intended that the scope of this invention be defined by the following claims, including all equivalents, rather than by the illustrative embodiments described above.

I claim:

1. In a multi-color, high density recording medium including a substrate and having at least two patterned interference filters formed thereon, wherein each of the filters transmits a different wavelength range of visible light, wherein each of the filters comprises an unpatterned interference layer of an inorganic material which is substantially absorption-free in the visible wavelength range of the spectrum, and wherein each interference layer is bounded on each side by a reflecting layer of an inorganic material, the improvement comprising:

at least one of the interference filters formed on the substrate comprises a first, unpatterned reflecting layer positioned on one side of the respective interference layer; and a second, patterned reflecting layer positioned on the other side of the respective interference layer, opposed to the unpatterned reflecting layer, such that said at least one interference filter is defined between the first and second reflecting layers and the pattern of only the second reflecting layer forms the pattern of said at least one interference filter.

2. The invention of claim 1 wherein said at least one of the first and second reflecting layers comprises a metallic film.

3. The invention of claim 1 wherein at least one of the first and second reflecting layers comprises a high refraction, inorganic material which is substantially absorption-free in the visible wavelength range.

4. In a multi-color, high density recording medium including a substrate having at least two patterned interference filters formed thereon, wherein each of the filters transmits a different wavelength range of visible light, wherein each of the filters comprises an unpatterned interference layer of an inorganic material which is substantially absorption-free in the visible wavelength range of the spectrum, and wherein each interference layer is bounded on each side by at least one high refraction reflecting layer of an inorganic material which is substantially absorption-free in the visible wavelength range, the improvement comprising:

at least one of the interference filters formed on the substrate comprises a first, unpatterned high refraction reflecting layer positioned on one side of the respective interference layer and a second, patterned high refraction reflecting layer positioned on the other side of the respective interference layer, such that said at least one interference filter is defined in the region where the first and second reflecting layers are aligned over one another and the pattern of only the second high refraction reflecting layer forms the pattern of said at least one interference filter.

5. The invention of claim 4 wherein said at least one interference filter further comprises:

first and second unpatterned low refraction reflecting layers positioned adjacent the first and second high refraction reflecting layers, respectively; and third and fourth high refraction reflecting layers positioned adjacent the first and second low refraction reflecting layers, respectively, such that the first low refraction reflecting layer is positioned between the first and third high refraction reflecting layers and the second low refraction reflecting layer is positioned between the second and fourth high refraction reflecting layers.

6. The invention of claim 5 wherein both the third and fourth high refraction reflecting layers are unpatterned.

7. A multi-color, high density recording medium comprising at least two patterned interference filters supported on a substrate, said recording medium comprising:

a substrate;

a first patterned interference filter for a first color, said first filter being mounted on the substrate and comprising first upper and lower reflecting layers of an inorganic material separated by a first unpatterned interference layer of an inorganic material which is substantially absorption free in the visible wavelength range of the spectrum;

a second patterned interference filter for a second color, distinct from the first color, said second filter comprising second upper and lower reflecting layers of an inorganic material separated by a second unpatterned interference layer of an inorganic material which is substantially absorption free in the visible wavelength range of the spectrum;

one of said first reflecting layers and one of said second reflecting layers cooperating to form a single, unpatterned, common reflecting layer which extends over substantially the entire area of the substrate in a layer of substantially constant thickness;

the other of said first reflecting layers and the other of said second reflecting layers being patterned to define the patterns of the respective filters such that each of the respective filters is defined in the region where the respective patterned reflecting layer is aligned with and overlies the common reflecting layer.

8. The invention of claim 7 wherein each of the reflecting layers comprises a respective metallic film.

9. The invention of claim 7 wherein each of the reflecting layers comprises a respective high refraction, inorganic material which is substantially absorption-free in the visible wavelength range.

10. The invention of claim 9 wherein each of the high refraction reflecting layers is bounded on one side by a respective unpatterned low refraction layer, which is in turn bounded by a respective unpatterned high refraction layer.

11. The invention of claim 1 wherein the patterned reflecting layer is formed photolithographically.

12. The invention of claim 4 wherein the patterned high refraction reflecting layer is formed photolithographically.

13. The invention of claim 7 wherein the other of the first and second reflecting layers is formed photolithographically.

14. A multi-color, high density recording medium comprising at least two patterned interference filters supported on a substrate, said recording medium comprising:

a substrate;

a common, unpatterned reflecting layer of an inorganic material which extends over substantially the entire area of the substrate;

a first, unpatterned interference layer of an inorganic material which is substantially absorption-free in the visible wavelength range of the spectrum and is disposed over the common reflecting layer;

a first patterned reflecting layer of an inorganic material disposed over the first interference layer, said first patterned reflecting layer cooperating with the first interference layer and first portions of the common reflecting layer aligned with the first patterned reflecting layer to form a first patterned interference filter for transmitting a first color;

a second unpatterned interference layer of an inorganic material which is substantially absorption-free in the visible wavelength range of the spectrum and is disposed over the first patterned reflecting layer; and a second patterned reflecting layer of an inorganic material disposed over the second interference layer, said second patterned reflecting layer cooperating with the first and second interference layers and second portions of the common reflecting layer aligned with the second patterned reflecting layer to form a second patterned interference filter for transmitting a second color, distinct from the first color.

15. The invention of claim 14 wherein the common reflecting layer and the first and second patterned reflecting layers comprise respective metallic films.

16. The invention of claim 1 wherein the common reflecting layer and the first and second patterned reflecting layers comprise respective layers of a high refraction, inorganic material which is substantially absorption-free in the visible wavelength range.

17. The invention of claim 1 wherein one of the two interference layers is positioned at least partially to overlie the other.

18. The invention of claim 4 wherein one of the two interference layers is positioned at least partially to overlie the other.

19. The invention of claim 7 wherein one of the two interference layers is positioned at least partly to overlie the other.

* * * * *